United States Patent
Lai

(10) Patent No.: US 6,953,179 B2
(45) Date of Patent: Oct. 11, 2005

(54) REFINED HOLDER STRUCTURE

(76) Inventor: Li-Chun Lai, 21Fl.-1, No. 33, Sec. 1, Minsheng Rd., Panciao City, Taipei County (TW)

( * ) Notice: Subject to any disclaimer, the term of this patent is extended or adjusted under 35 U.S.C. 154(b) by 0 days.

(21) Appl. No.: 10/752,781

(22) Filed: Jan. 7, 2004

(65) Prior Publication Data

US 2005/0145771 A1    Jul. 7, 2005

(51) Int. Cl.$^7$ ............................................. F16M 13/00
(52) U.S. Cl. ........................ 248/522; 248/523; 248/521; 47/40.5; 47/32.4
(58) Field of Search ........................ 248/522, 511, 519, 248/521, 523, 346.01; 47/40.5, 39, 65, 42, 47/32.4, 44, 47

(56) References Cited

U.S. PATENT DOCUMENTS

| | | | | |
|---|---|---|---|---|
| 1,598,016 A | * | 8/1926 | Runser | ........................ 248/539 |
| 2,317,049 A | * | 4/1943 | Ginka | ........................ 47/40.5 |
| 3,038,688 A | * | 6/1962 | Thorburn | ...................... 47/40.5 |
| 3,042,350 A | * | 7/1962 | Lencioni | ...................... 47/40.5 |
| 4,895,339 A | * | 1/1990 | Yang et al. | .................. 248/522 |
| 5,255,886 A | * | 10/1993 | Wang | .......................... 248/522 |
| 5,647,569 A | * | 7/1997 | Sofy | ............................ 248/522 |
| 5,713,554 A | * | 2/1998 | Lai | .............................. 248/522 |
| 5,878,989 A | * | 3/1999 | Allman | ........................ 248/522 |
| 5,921,022 A | * | 7/1999 | Baker | .......................... 47/40.5 |
| 5,979,859 A | * | 11/1999 | Vartanov et al. | ............ 248/522 |
| 6,087,946 A | * | 7/2000 | Menard, Jr. | ................. 340/618 |
| 6,510,649 B2 | * | 1/2003 | Nosker | ........................ 47/40.5 |
| 6,536,721 B1 | * | 3/2003 | Kao | ............................ 248/131 |
| 6,739,566 B1 | * | 5/2004 | Kao | ............................ 248/522 |

* cited by examiner

*Primary Examiner*—Kimberly Wood
(74) *Attorney, Agent, or Firm*—Apex Juris, pllc; Tracy M Heims

(57) ABSTRACT

A refined holder structure is provided. The refined holder structure mainly includes a base having at lest one or more prop to surround thereof, wherein one of the prop is designed to be a socket with an extended line for supplying the power, and a hole mounted on a central portion thereof for mounting a sleeve, thereby through seting the sleeve, a Christmas tree can be inserted in the sleeve, and further through the socket mounted on the prop, the plugs of the decorated electric equipments (e.g. Christmas light decoration) on the tree can be put in the socket for conveniently supplying the power.

1 Claim, 4 Drawing Sheets

REFINED HOLDER STRUCTURE

BACKGROUND OF THE INVENTION

1. Field of the Invention

The present invention relates to a refined holder structure, and more particularly to a refined holder structure for an electric equipment which has a socket with an extended line directly mounted thereon so as to achieve a purpose of conveniently supplying the power to the electric equipment.

2. Description of the Prior Art

As December comes, Christmas is mostly expected by everyone. All households without exception will arrange the Christmas tree inside or outside the house for increasing the holiday atmosphere. Furthermore, for shining the Christmas tree, people always decorate the tree through surrounding the Christmas light decorations or hanging the decorations thereon. However, it has to rely on the power supply so that the light can be illuminated and the tree can be own a splendid appearance at night. Therefore, in order to make the light decorations to illuminate, people always seek the assistance of the socket with an extended line to supply the power to the light decorations or other electronic equipments on the tree.

However, it appears that the socket with an extended line is not always available at any time, and if being short of the assistance of the socket with the extended line, the light decorations will lose the original effect thereof. Consequently, it is an emergency to design a holder having a socket with an extended line mounted thereon for positioning the Christmas tree.

Thus, it can be seen, the prior art described above still has some defects, is not a good design, however, and is urgently to be improved.

Because of the technical defects of described above, the applicant keeps on carving unflaggingly to develop a refined holder structure through wholehearted experience and research.

SUMMARY OF THE INVENTION

An object of the present invention is to provide a refined holder structure having a socket with an extended line directly mounted thereon for directly supplying the power to an electric equipment mounted on the refined holder structure.

Another object of the present invention is to provide a refined holder structure for inserting a Christmas tree therein.

For achieving the purposes described above, the refined holder structure according to the present invention includes a base, wherein the base has at least one or more opening set thereon to surround thereof, a combining plate is correspondingly mounted at a bottom side of the opening and the central portion of the base has a hole set thereon for inserting a sleeve; and at least a prop respectively combined with each opening of the base, wherein a front end of the prop further has an upper fastener and a lower fastener mounted thereon, a bottom surface of the prop has a hollow combining pillar downwardly extended from a proper central position thereof, through the fasteners, the front end of the prop can be engaged with the opening, the position of the hollow combining pillar of the prop is corresponding to that of the combining plate of the base and they are combined together through a fixing-and-locking element so that the prop can be stably combined on the opening, and the prop also can be designed to be a socket with an extended line for supplying the power; thereby, through setting the sleeve, the Christmas tree or other electric equipments can be inserted into the sleeve and, through the socket on the prop, the plug of the electric equipment can be directly put into the socket on the prop and thus the user does not need to further install an additional socket with an extended line so as to conveniently achieve the effect of power supply.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
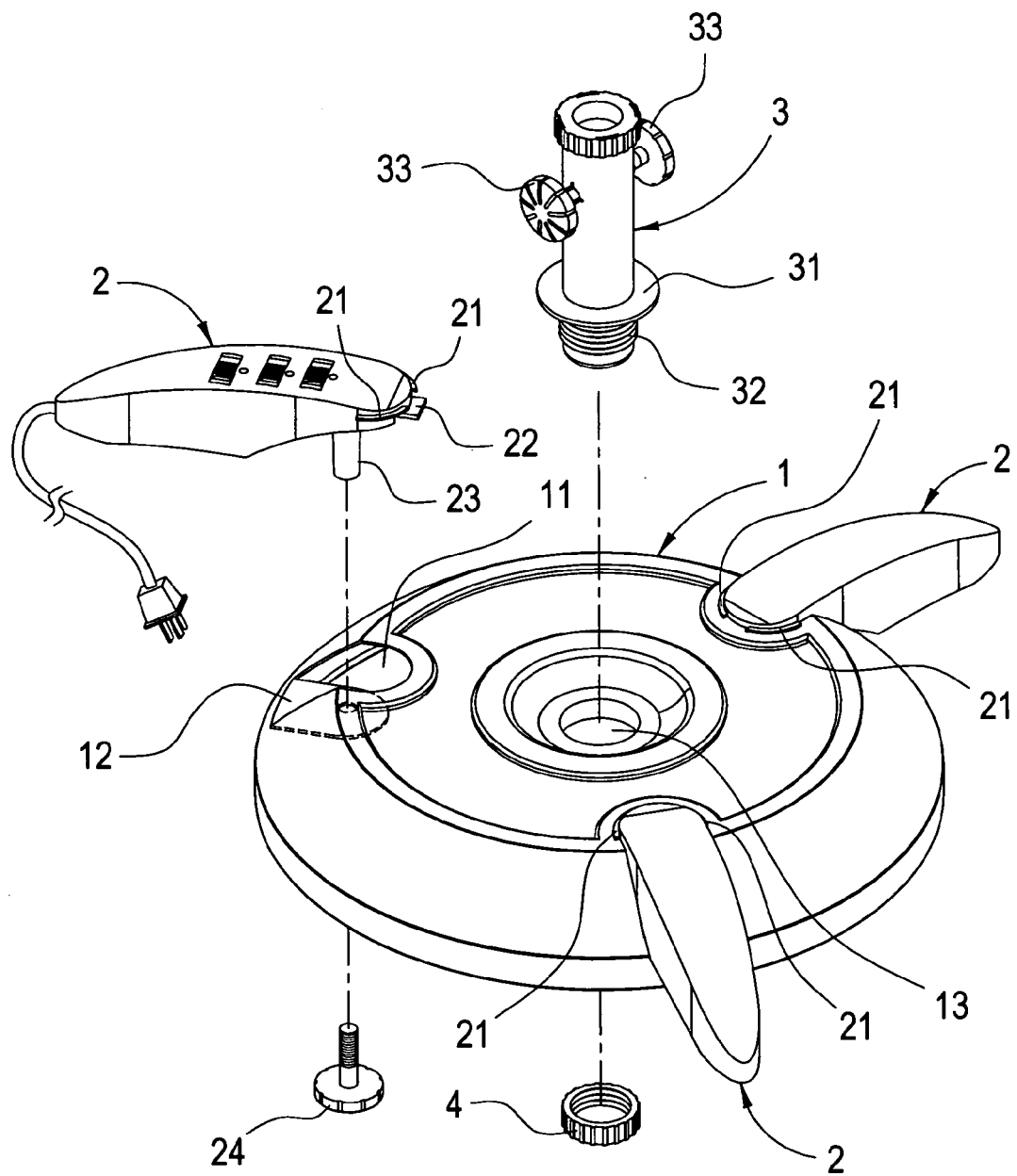
FIG. 1 is a three-dimensional decomposition view showing a refined holder structure according to the present invention.
Figure 2:
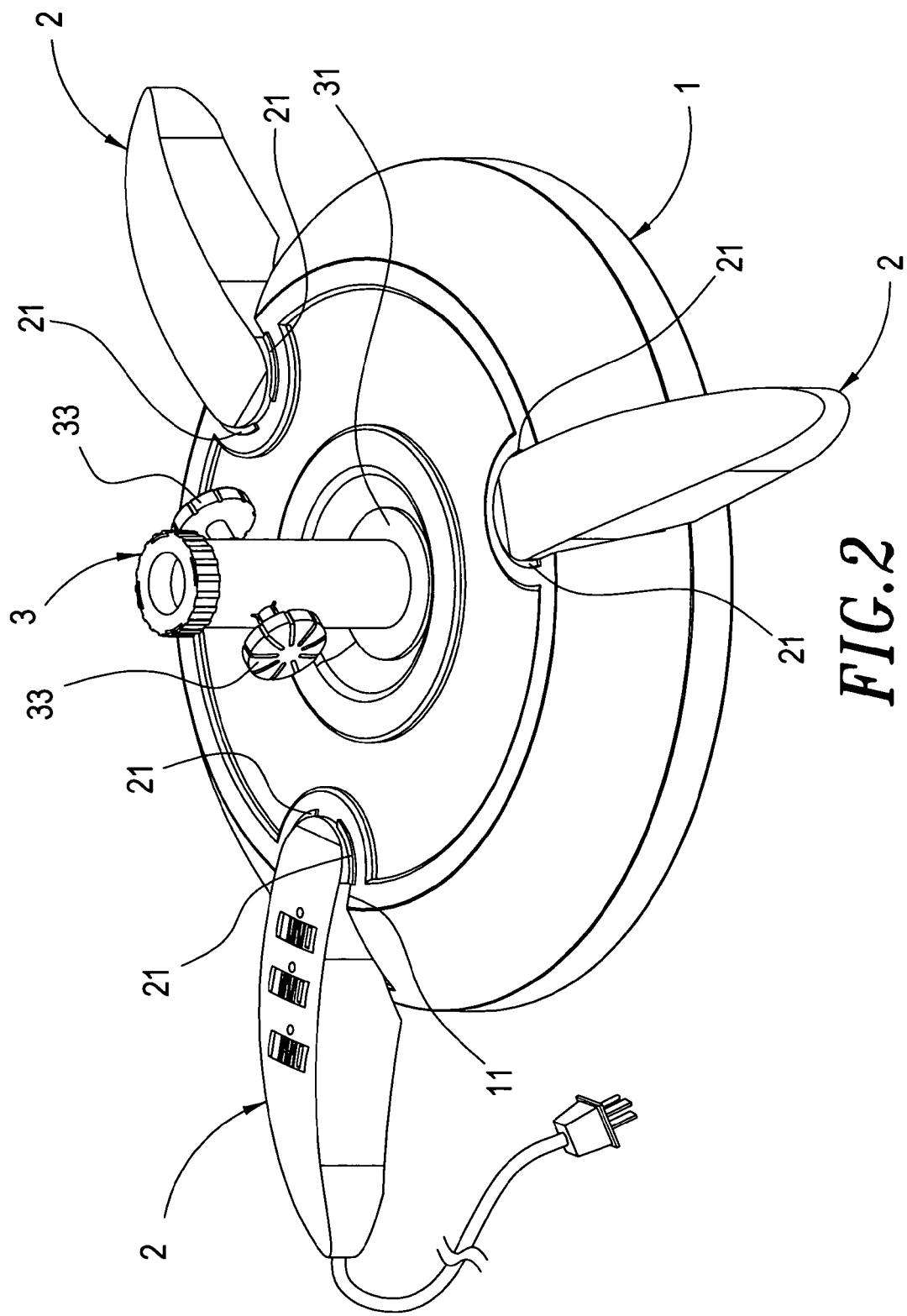
FIG. 2 is a three-dimensional combination view showing the refined holder structure.
Figure 3:
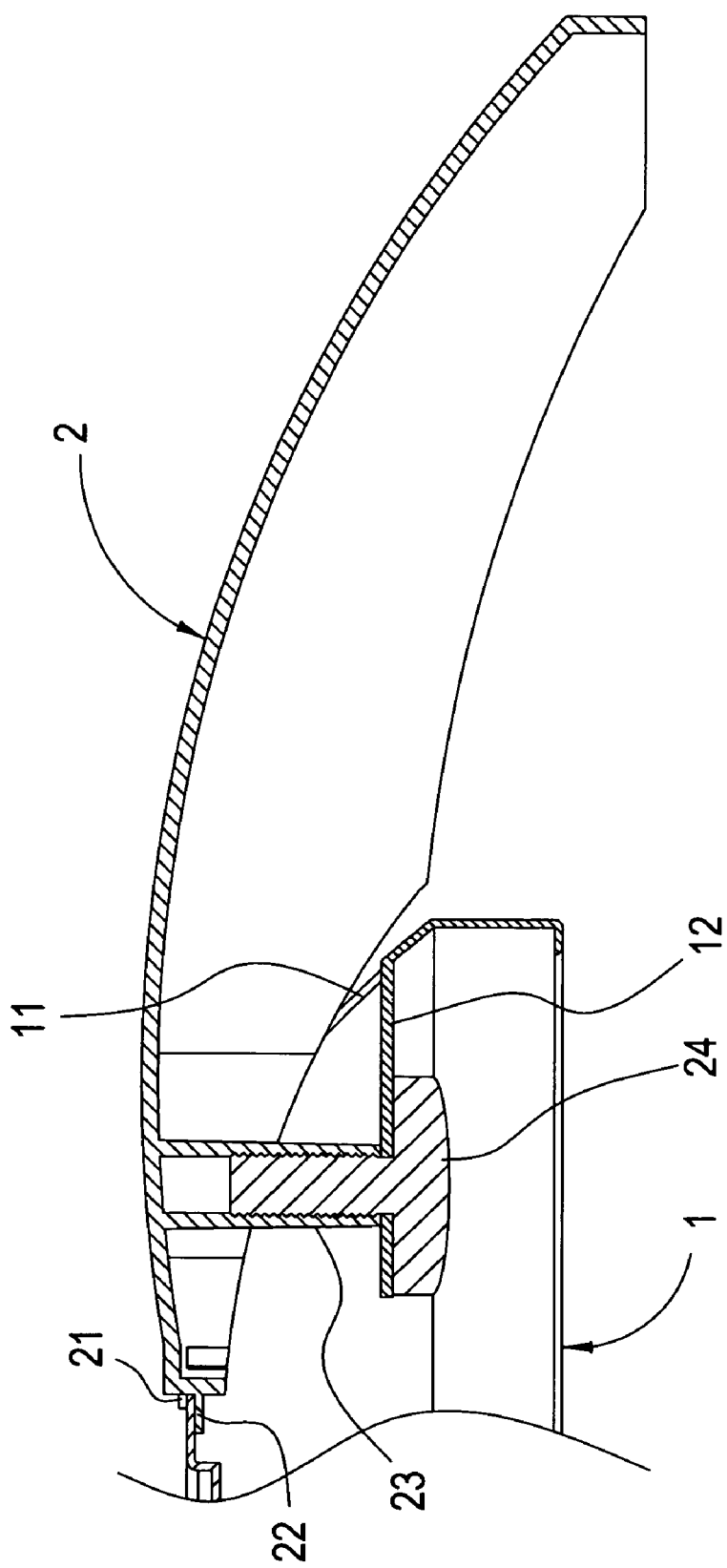
FIG. 3 is a partial cross-sectional view showing the refined holder structure.

Please refer to FIGS. 1 to 3, which respective illustrate a three-dimensional decomposition view, a combination view and a partial cross-sectional view of a refined holder structure according to the present invention. The refined holder structure mainly includes:

a base 1, wherein at least one or more opening 11 is set thereon to surround the base 1 and a combining plate 12 is correspondingly mounted at a bottom side of the opening 11, the combining plate 12 has a hole mounted thereon and the central portion of the base has a hole 13 set thereon;

a sleeve 3, wherein a blocking element 31 is mounted on a lower portion of the sleeve 3 and a thread 32 is mounted on the lower portion of the sleeve 3 below the blocking element 31, a retaining element 33 is mounted on two sides of the sleeve 3 at a proper position, the sleeve 3 is mounted on the hole 13 of the base 1 until the blocking element 31 of the sleeve 3 is rejected against the top surface of the base 1 so that the thread 32 located at the lower portion of the sleeve 3 is protruded through the bottom of the base 1, and, through combining a fixing-and-locking element 4 with the thread 32 at the lower portion of the sleeve 3, the sleeve 3 can be stably combined on the base 1;

at least one or more prop 2, wherein a front end of the prop 2 has an upper fastener 21 and a lower fastener 22 mounted thereon, a bottom surface of the prop 2 has a hollow combining pillar 23 downwardly extended from a proper position thereof, the hollow combining pillar 23 has a thread set thereinside, through the fasteners 21 and 22 of the prop 2, the front end of the prop 2 can be engaged with an edge of one side of the opening 11, the position of the hollow combining pillar 23 of the prop 2 is corresponding to that of the combining plate of the base 1 and they are combined together through a fixing-and-locking element 24 so that the prop 2 can be stably combined on the opening 11 (as shown in FIGS. 2 and 3), one of the prop 2 can be designed to be a socket with an extended line for supplying the power, and the socket with the extended line can be set on any portion of the base 1 or the sleeve 3.

Consequently, through combining the components described above, the refined holder structure according to the present invention is formed.

Figure 4:
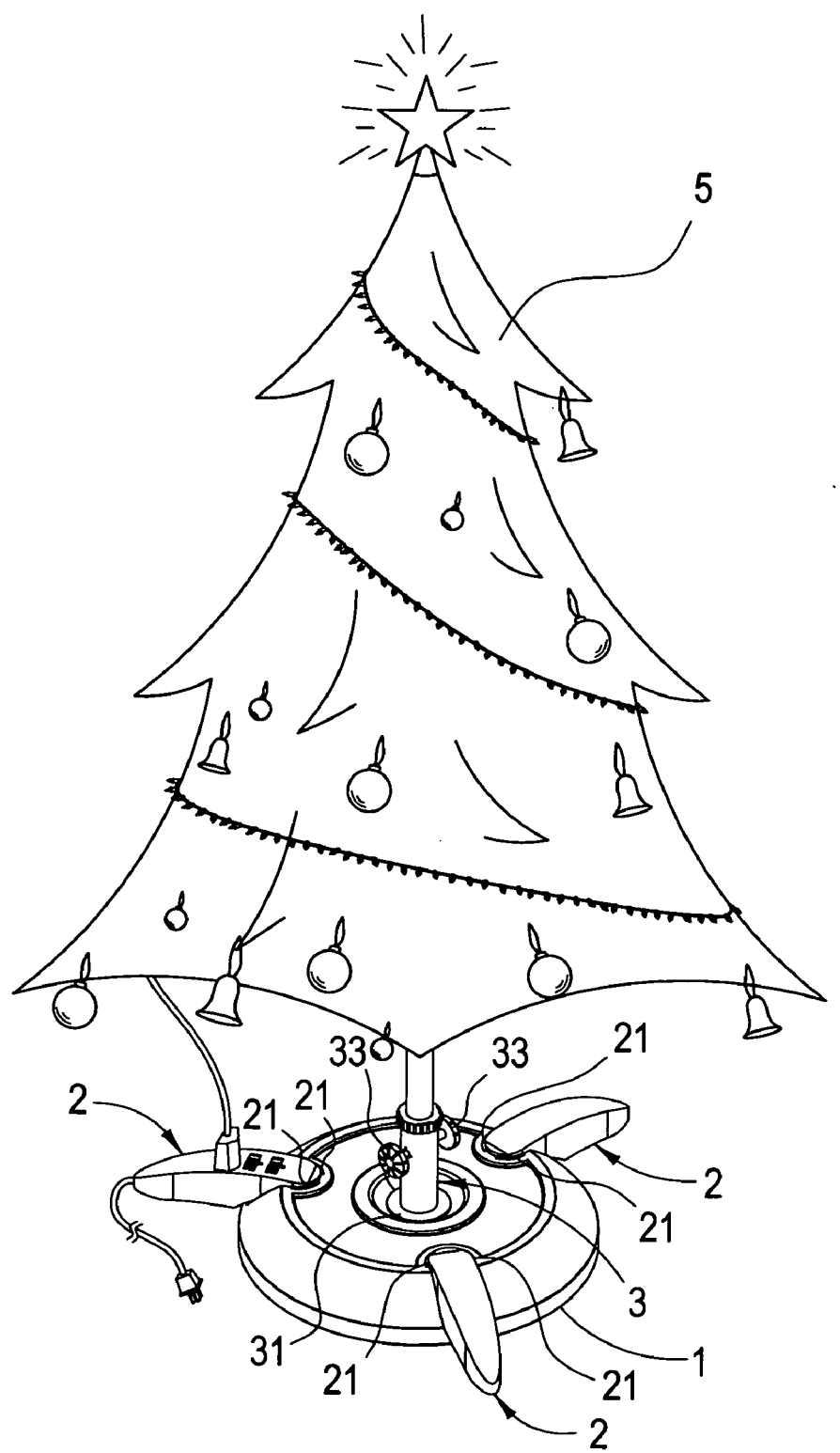
FIG. 4 is a practicing schematic view of the refined holder structure.

Please refer to FIG. 4 which is a practicing schematic view showing the refined holder structure according to the present invention. Take Christmas tree 5 as an example, the Christmas tree 5 is inserted into the sleeve 3 and is tightly clamped by the retaining element 33. Therefore, the Christmas tree 5 can be stably positioned in the sleeve 3 and then the light decorations or other electric equipments can be mounted on the tree 5. At this time, the user can directly put the plug into the socket on the prop without further installing an additional socket with an extended line so as to conveniently achieve the effect of power supply.

The refined holder structure according to the present invention, when being compared with the other prior arts, further includes the advantages as follows:

1. The present invention is designed to directly mount a socket with an extended line on the holder for directly supplying the power to the equipment mounted on the holder.

2. In addition to be provided for mounting a Christmas tree, the present invention further can be provided for other equipments being mounted thereon.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A refined holder structure, comprising:

a base with a hole at a central portion with a mounting sleeve;

at least one prop connected to said base, wherein said prop is designed to be a socket with an extended line for supplying-power;

wherein said sleeve further comprises a blocking element and a thread portion below said blocking element so that when said sleeve is mounted to said hole of said base and said blocking element is rejected against said base, said thread portion of said sleeve is protruded through the bottom of said base and fixed by a first fixing-and-locking element so that said sleeve is stably combined on said base;

wherein said base has at least one or more openings and a combining plate is correspondingly mounted at a bottom side of said at least one or more openings, and said combining plate has a second hole therein; and a front end of said prop further has an upper fastener and a lower fastener mounted thereon, a bottom surface of said prop has a hollow combining pillar downwardly extended therefrom, said hollow combining pillar has an inner thread set; thereby through engaging said fasteners with said at least one or more openings of said base, said combining pillar of said prop is corresponded to said combining plate of said base, and further through a second fixing-and-locking element, said prop is stably combined on said base.

* * * * *